United States Patent
Kennedy et al.

(10) Patent No.: US 12,025,717 B2
(45) Date of Patent: Jul. 2, 2024

(54) PULSED WIRELESS GPS-DENIED POSITIONING/NAVIGATION/TIMING SYSTEM

(71) Applicant: ADAPT IP COMPANY, Campbell, CA (US)

(72) Inventors: Philip Thrasher Kennedy, Cedar Rapids, IA (US); Joseph Alvin Gerke, Hiawatha, IA (US)

(73) Assignee: ADAPT IP COMPANY, Campbell, CA (US)

(*) Notice: Subject to any disclaimer, the term of this patent is extended or adjusted under 35 U.S.C. 154(b) by 164 days.

(21) Appl. No.: 17/343,372

(22) Filed: Jun. 9, 2021

(65) Prior Publication Data

US 2021/0382183 A1 Dec. 9, 2021

Related U.S. Application Data

(60) Provisional application No. 63/036,514, filed on Jun. 9, 2020.

(51) Int. Cl.
| | | |
|---|---|---|
| *G01S 19/42* | (2010.01) | |
| *G01S 7/28* | (2006.01) | |
| *G01S 7/41* | (2006.01) | |
| *G01S 13/02* | (2006.01) | |
| *G01S 13/46* | (2006.01) | |

(52) U.S. Cl.
CPC .......... *G01S 19/421* (2013.01); *G01S 7/2806* (2013.01); *G01S 7/41* (2013.01); *G01S 13/0218* (2013.01); *G01S 13/46* (2013.01)

(58) Field of Classification Search
None
See application file for complete search history.

(56) References Cited

U.S. PATENT DOCUMENTS

| | | | | |
|---|---|---|---|---|
| 2009/0141591 | A1* | 6/2009 | Basilico | G01S 1/80 701/472 |
| 2009/0184868 | A1* | 7/2009 | Liu | G01S 19/32 342/357.27 |
| 2010/0235095 | A1* | 9/2010 | Smitherman | G03B 37/04 702/94 |
| 2010/0260150 | A1* | 10/2010 | Aryan | G01S 5/14 370/336 |

* cited by examiner

*Primary Examiner* — Timothy A Brainard
*Assistant Examiner* — Helena H Seraydaryan
(74) *Attorney, Agent, or Firm* — DLA Piper LLP (US)

(57) ABSTRACT

This invention describes a Spatial Intelligence System that provide radio positioning/navigation with additional spatial data in support of automation, machine learning and inference-based systems. More specifically and in particular, the present invention, is such a radio positioning/navigation system that integrates, correlates with or obviates the need of the global navigation satellite systems (GNSS) with a Pulsed Wireless Location System (PWLS) to provide positioning/navigation/timing data either within a line-of-sight barrier using an ad-hoc coordinate system, a direct line of sight of GNSS beacon geographic coordinate system or a ad-hoc translation to geographic coordinate system. The system generically offers the ability to use a low cost tag or location device with anchor processing or a higher cost, higher capability tag or location device with local processing simultaneously.

7 Claims, 2 Drawing Sheets

PULSED WIRELESS GPS-DENIED POSITIONING/NAVIGATION/TIMING SYSTEM

CROSS-REFERENCE TO RELATED APPLICATIONS

Claims benefit of provisional application 63/036,514 filed 2020 Jun. 9

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to radio positioning/navigation systems. More specifically and in particular, the present invention, hereinafter described in accordance with the current best mode of practice, is such a radio positioning/navigation system that integrates, correlates or obviates the global navigation satellite systems (GNSS) with a Pulsed Wireless Location System (PWLS) to provide positioning/navigation/timing data either within a line-of-sight barrier, or in direct line of sight of GNSS beacons. In addition, the present invention overcomes the inherent problems of current radio positioning/navigation systems, such as multipath signal propagation, the "near-far" problem, located device power consumption and the inability for low power GNSS signals to penetrate a barrier.

2. Discussion of the Prior Art

A common need, or requirement of our society is to accurately track and record positions of aircraft, land vehicles, geographical landmarks, materials, buildings, animals, people, and other objects. One system currently used to accomplish this goal is radio positioning/navigation beacons and associated equipment. Radio positioning/navigation can be broadly defined as the use of radio waves to transmit information, which in turn can be received and utilized to determine position and navigate. Some radio positioning/navigation systems historical, currently in use or under development, are Loran, Omega, LMN, and Global Navigation Satellite Systems (GNSS) such as NAVSTAR, GLONASS (the Russian variant), and European systems (GNSSI, GNSS2, NAVSTAT and GRANAS). The radio positioning/navigation systems standard worldwide is the Global Navigation Satellite Systems (GNSS) NAVSTAR Global Positioning system (GPS). The NAVSTAR GPS system is capable of providing real-time, three-dimensional position, timing and navigation data.

The NAVSTAR GPS beacon system presently consists of twenty-four orbiting satellites, spaced in six separate circular orbits, with each accommodating four satellites. Of these, twenty-one are normally operational and three serve as spares. Each NAVSTAR GPS satellite reappears above the same ground reference approximately every twenty-three hours and fifty-six minutes. The spacing of satellites is designed to maximize probability that earth users will always have at least four satellites in good geometrical view for navigational use. The basic method of position determination via radio positioning and navigation signals is derived from the concept of multi-lateration. The term multi-lateration used herein refers to the general process of determining distance, a.k.a. range, from the present position to or from multiple known anchors, and mathematically solving for the point in space which satisfies these conditions. As applied to GNSS, the procedure requires calculation of signal travel time, which, when multiplied by the speed of light, renders distance.

A basic discussion of positioning/navigation as it relates to the NAVSTAR GPS is available at GPS.gov. This site particularly describes the background of the NAVSTAR Global Positioning System, as well as technical descriptions, performance characteristics and actual user segments.

Standard GNSS receivers can typically produce position estimates within 30 meter accuracy. Sub-meter position accuracy of location can be achieved using differential positioning, known as differential global positional system (DGPS). Other techniques for improving accuracy involving secondary beacons or receivers are based on "Carrier-phase GPS", "Wide Area Augmented GPS" (WAAS), and GPS Interferometry.

During the development of the NAVSTAR GPS program, the United States Government made decisions to extend its use to both domestic and international communities. Its applications range from navigation over the land, in the air, and on the seas, to precision surveys and the tracking of trains and trucks. As GNSS is the global standard for positioning/navigation applications when in line of sight of the beacons, therefore the following discussion focuses on GNSS.

The present invention, however, has equal applicability to other radio positioning/navigation systems that provide for global positioning and navigation. GNSS systems offer the advantage of providing precise locations when the receiver is in direct line of sight of the satellite beacons. However, one critical limitation of these GNSS systems is it requires the beacons to be "in view" relative to the receiver. It is important to note that GNSS solutions are only accomplished when the GNSS receiver is in direct line of sight (LOS) with the orbiting GNSS beacons. In other words, if the GNSS receiver's antenna is used in heavily forested areas, in steep and narrow canyons, within a structure, adjacent to the outer walls of buildings, or various other line-of-sight barriers (LSB), the receiver will be unable to obtain a repeatable reading, or in many cases, any reading at all. While GNSS systems have many important uses in wide open spaces, they are not useable within environments separated by line-of-sight barriers (LSB).

What is needed is a system that provides repeatable, precise sub-meter positioning/navigation data for locating objects in places where standard GNSS signals do not penetrate. The result of such an all encompassing system is accurate, consistent positioning and navigation data for a wide variety of applications that can be used both in direct line of sight of GNSS beacons and within environments that do not these signals to penetrate. In addition to the GNSS information discussed above, other related U.S. patents also deal exclusively with radio positioning/navigation within a line-of-sight barrier (LSB). Such references include, for example:

U.S. Pat. No. 9,763,050 to Belghoul et al, estimates a location of a wireless device in communication with a wireless network, such as a UMTS network, based at least in part on WLAN/WPAN AP measurements and/or barometric measurements.

U.S. Pat. No. 9,103,916 to Waters et al, explains a method for positioning a wireless device by determining a reference location of a wireless device, based on satellite positioning, as the device passes between areas of satellite positioning signal reception and satellite positioning signal non-reception. While in the areas of non-reception, signals transmitted by wireless local area network (WLAN) access points (AP's) and parameters of motion of the device are measured.

U.S. Pat. No. 9,430,781 to Kerr et al, A method where beacons are disposed within a physical premises and each beacon transmits a signal containing identifying information. A networked indoor positioning module receives measured reference points that include a measured beacon identifier and a measured signal strength.

U.S. Pat. No. 10,015,769 to Younis et al, discloses systems and methods for determining a location of a mobile device within an indoor environment by receiving the signals from use the positioning nodes and use the aiding information to determine a three dimensional position within the indoor environment based on one-way time difference of arrival of the signals.

Operating within a line-of-sight barrier (LSB) places fundamental limitations on the performance of radio positioning/navigation systems. The existence of multi-path with different time delays, gives rise to complex, time-varying transmission channels. A direct line-of-site path between beacons and receiver seldom exists within a line-of-sight barrier (LSB), because of interference or reflection from natural or man-made objects, and one must rely on the signal arriving via multi-path. Signals can be received, but the equipment required to mitigate and correct for multi-path remains complex and sophisticated. These multi-path problems, in effect, have limited the practical commercial use of radio transmission of positioning/navigation data within a line-of-sight barrier (LSB).

Another dilemma associated with radio transmission of positioning/navigation data within a line-of-sight barrier is a phenomenon known as the "near-far" problem. The near-far problem is due to simultaneous broadcasting of signals from multiple broadcast antennae. This problem arises because of the large variation of the user-to-broadcast antennae range. One advantage of using GNSS signals is the average power being received from the GNSS satellite beacons remains approximately constant due to the large distance of the satellite beacons from the GNSS receiver(s). On the other hand, the broadcast antenna power from local broadcast antennae varies a great deal, due to the inverse proportion to the square of the receiver's distance from the broadcast antennae, and can overwhelm other incoming signals.

Although there have been attempts to use radio positioning/navigation signals within a line-of-site barrier, to date the use of this technology is commercially impractical because of the problems described in the previous discussions. In exploiting information from traditional RF techniques and systems, impulse radio techniques provide an innovation in radio signal transmissions analysis for location.

The preceding positioning/navigation technologies all range from a variety of limitations. GPS simply cannot operate within a Line of Sight Barrier (LBS). Proximity systems can only indicate "it's approximately here" and requires a-priori knowledge of the location of the proximity beacons.

Common to almost all indoor positioning systems is the calculation of position by the mobile device or transmitting data from the mobile device to a server for assistance. This requires reliable communication paths and requires significant power to provide constant location. As devices decrease in size the power capacity of batteries limit the viability to locate these devices.

A Pulsed Wireless Location System (PWLS) provides a comprehensive, innovative solution to the increasing demand for location services within and around a line-of-sight barrier (LSB).

As it relates to this present invention, geo-positioning and positioning/navigation are assumed to be one the same. The PWLS system can calculate distances with sub-meter accuracy, this is achieved due to the precise measurement of incoming pulsed communications. Positioning/navigation is determined by multi-lateration of these precise measurements. It is important to note that a PWLS is not a global positioning/navigation system. Although multi-mile ranges are capable with this technology, it does not provide global integration with GNSS positioning/navigation systems. Therefore, the provision to utilize devices with GNSS capability in common with the communication systems of the present invention is possible. This enables a registration of an independent coordinate system with a GNSS/GIS (Global Information System) for the purpose of establishing a Global location within a line-of-sight barrier (LSB). This resolves a common need in society for a comprehensive integration and correlation of these two robust navigation/positioning systems.

The present invention can utilize PWLS alone or both GNSS and PWLS technologies to provide positioning/navigation capabilities both in direct line of sight (LOS) of GNSS beacons, and within a line-of-sight barrier (LSB) using PWLS anchors. The present invention results in a complete system that provides accurate, consistent positioning and navigation information for a wide variety of internal and external applications.

BRIEF SUMMARY OF THE INVENTION

The importance of positioning/navigation systems are becoming widely recognized as necessary in today's society. There is a current need in business and industry to precisely locate and/or track the movement of people and material assets whether they are located indoors, outdoors, or moving in between. The prior art discussed above does not meet these needs because they lack precision, are incapable of operating within shielded environments or interior spaces or consume available power resources. Prior to the present invention disclosed herein below, there has not been a positioning/navigation system that precisely and cost effectively locates objects or people in both exterior and interior environments.

The present invention is a comprehensive system for positioning and navigation when separated by a barrier from being in the line of sight (LOS) of orbiting GNSS beacons, hereinafter, referred to as "within a line-of-sight barrier" (LSB). Within a line-of-sight barrier (LSB), the present invention utilizes PWLS signals to determine positioning and navigation information. PWLS anchors may be located within, or outside a line-of-sight barrier (LSB). The PWLS anchors must be non-coplanar, in order to determine altitude. The transceiver/processors and PWLS anchors are a system which communicate with each other or to a common server or cloud-based server in order to determine local positioning and navigation data. The present invention can also integrate and correlates GNSS and PWLS positioning and navigation data into a seamless coordinate format.

The present invention specifically is comprised of transceiver/processors, PWLS anchors of three or more at fixed relative locations, an optional host or cloud computer which can provide enhanced information services. A transceiver/processor, which can be either mobile or fixed, is comprises a PWLS transceiver/processor, and a data link to communicate with other transceiver/processors, and/or an optional host/cloud computer. The transceiver/processor may be contained in such devices as, but not limited too, a PWLS tag, a RFID tag, a cell phone, a computer, a personal data assistant (PDA), or other devices. The present invention accomplishes positioning and navigation by utilizing PWLS signals which are processed geometrically using multi-lateration and/or multi-lateralization techniques which yield positioning and navigation data. The transceiver/processor may also contain an optional data link which can be used communicate with other transceiver/processors, and/or an optional host/cloud computer. The optional host/cloud computer may be used to store, calculate, and output enhanced positioning and navigation information for various applications.

It is an object of the present invention to utilize PWLS technology for determining the positions of transceiver/processors within a line-of-sight barrier.

It is a further object of the present invention to overcome problems such as multi-path signal propagation, and the "near-far" problem associated with current radio positioning/navigation systems It is a further object of the present invention to integrate and correlate the position/navigation information from both GNSS systems and a PWLS system.

It is still a further object of the present invention to transmit data to an optional host/cloud computer for enhanced information services.

It is still a further object of the present invention for multiple transceiver/processors to communicate with each other.

These and other objects will be better understood from review of the detailed description which follows and in which the following definitions are applicable.

Definitions

Global Navigation Satellite System (GNSS)—A generic term for specific systems such as the Russian GLONASS and the United States NAVSTAR GPS, utilizing equipment which receives signals from a relevant constellation of navigational satellites in earth orbit. NAVSTAR Global Positioning System (NAVSTAR GPS)—The United States Government's satellite navigation system which broadcasts time and ranging data globally. Designed to provide a highly accurate, reliable, continuous 24-hour, worldwide coverage for position reporting and navigation.

Line-of-Sight—(LOS) Unobstructed linear signal path between radio positioning/navigation transmitters and receiving antennae.

Line-of-Sight Barrier—(LSB) Any barrier, solid or non-solid, that restricts direct linear receipt of any radio positioning/navigation signal.

Time Modulated Ultra-Wide Band (TM-UWB)—Impulse radio communicates data using baseband energy pulses of short duration across a wide radio spectrum.

Anchors—Relates to a device that emits or receives radio signals for positioning/navigation purposes.

Beacons—Relates to a device that emits radio signals for positioning/navigation purposes.

Radio Frequency (RF)—Radio transmission of data.

Pulsed Location Data—Data that define spatial intelligence including but not limited to environmental, physical and positional data (time, azimuth, tilt).

Pulsed Location Signals—Signals designed to enable high precision phase measurement in a multi-path environment.

Transceiver—Hardware that is capable of receiving and transmitting radio positioning/navigation signals or data.

Geographical Information System (GIS)—Any information system that is designed to work with data referenced by spatial or geographic coordinates. A GIS is both a database system with specific capabilities for spatially-referenced data, as well as a set of operations for mapping and analyzing the data.

Triangulation—Any mathematical procedure to calculate position based on the intersection of ranges from known points (includes all variations such as multi-lateration, tri-lateralization and resection, etc., whether or not angles, per se, are used).

DETAILED DESCRIPTION OF THE INVENTION

The present invention is now described with reference to the figures wherein like reference numbers denote like elements. The present invention is a system which can locate transceiver/processors 150 in real-time, with sub-meter accuracy when operating within a line-of-sight barrier 100 using PWLS anchors 130, 131, 132, 133. The PWLS anchors 130, 131, 132, 133 are shown outside or inside the line-of-sight barrier 100. In the present invention, positioning/navigation is accomplished using a transceiver/processor 150 which utilizes PWLS hardware but optionally standard and/or modified GNSS hardware. The PWLS and GNSS systems can be integrated and correlated using commercially available software with a data processor or cloud Processor. The data processor is part of the transceiver/processor 150 which is described fully in FIG. 2.

In describing the present invention, those skilled in the art and familiar with the instant disclosure of the present invention will recognize additions, deletions, modifications, substitutions, and other changes which will fall within the purview of the subject inventions and claims.

Figure 1:
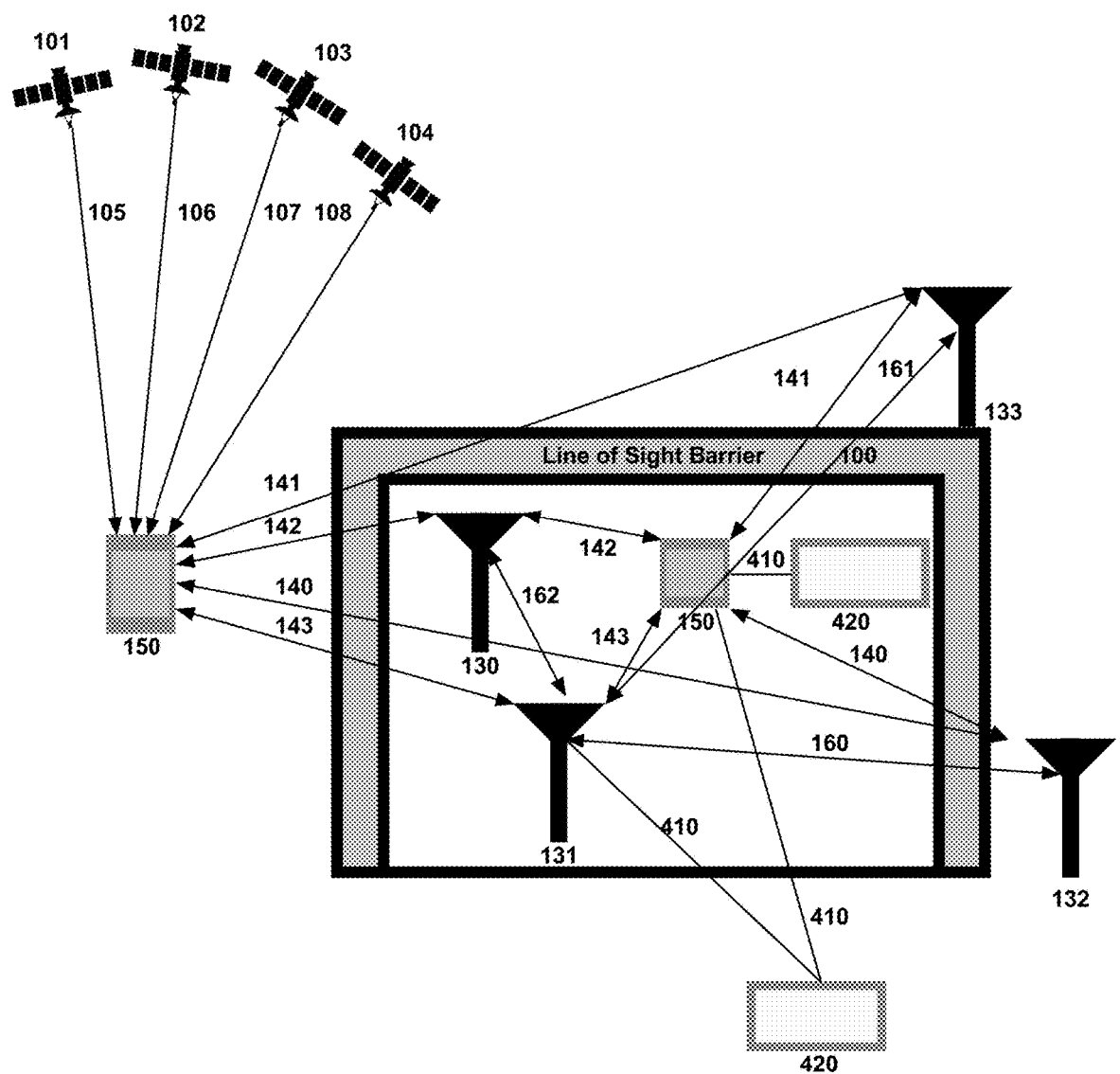
FIG. 1 is a schematic representation of the present invention wherein location and time data is used by transceiver/processors to determine positioning/navigation information. Within the line-of-sight barrier the PWLS mobile device may transmit or receive pulsed transmissions from the PWLS anchors. The transceiver/processors may use a data link to communicate with another transceiver/processor, and/or optional host computer to provide enhanced information services. When operating in direct line of sight LOS of GNSS anchors the GNSS capability of the transceiver/processor can be used and shared with the PWLS system.

FIG. 1 illustrates the general configuration of the present invention of a positioning/navigation system which is operating within a line-of-sight barrier 100 utilizing PWLS anchors. The line-of-sight barrier 100 may be a solid or non-solid barrier. Examples of a solid line-of-sight barrier 100 include, but not limited to, the roof of a structure, a heavy tree canopy, steep and narrow canyon walls, the walls of tall buildings, or within any enclosure. Examples of non-solid line-of-sight barriers 100 would include, but are not limited to, atmospheric anomalies, magnetic fields, etc. The basic necessary elements of this system used to determine the positioning and navigational coordinates of a transceiver/processor 150 operating within a line-of-sight barrier 100 by using PWLS anchors 130, 131, 132, 133 accurately surveyed, relatively surveyed or arbitrary to locations relative to the user's choice of system coordinates, and transceiver/processors 150 operating within a line-of-sight 100 by using PWLS anchors 130, 131, 132, 133 and optionally transceiver/processors 150 operating in direct line of sight of GNSS anchors 101, 102, 103, 104.

These PWLS anchors 130, 131, 132, 133 may be located outside, or within a line-of-sight barrier 100. For clarity, the PWLS anchors 130, 131, 132, 133 are shown both located inside or outside the line-of-sight barrier 100, mounted on walls or poles. The PWLS anchors 130, 131, 132, 133 are arranged in a geometrical pattern that is important for accurate multi-lateration with either a two or three-dimensional positioning/navigation system, as applicable. Specifically, it should be noted that in a two-dimensional system the operating centers of the anchors can be located co-linear, and in a three-dimensional system the operating centers of the anchors are not all located co-linear or co-planar.

The transmission paths 140, 141, 142, 143 are the shortest distances from the fixed, known location, PWLS anchors 130, 131, 132, 133 to any transceiver/processor 150 which is operating within the line-of-sight barrier 100. The transceiver/processor 150 uses the positioning/navigation data received from the PWLS anchors 130, 131, 132, 133 to collect data for positioning and navigation.

This positioning and navigation data may be optionally transmitted via radio transmission path 410 to a host computer 420 for further analysis or use. Unlike GNSS systems, radiating PWLS signals simultaneously from multiple anchors is subject to a "near-far" problem. This problem arises because of the large variation of the user-to-broadcast beacon range. The broadcast power from PWLS anchors 130, 131, 132, 133 varies a great deal; it is inversely proportional to the square of the transceiver/processor's 150 distance from the broadcast anchors 130, 131, 132, 133, and can overwhelm incoming PWLS beacon signals. The PWLS system overcomes the "rear-far" problem by sequencing PWLS in Beacon transmitting versions of the invention or through multiple access methods in a Beacon receiving versions of the invention using anchors 130, 131, 132, 133 wirelessly communicating to processor resources 420.

An alternative and possibly preferred method of operation uses a transmission from the transceiver/processor 150 to the anchors 130,131,132,133. This enables a low power, low cost transceiver/processor 150. The anchors can communicate via 160,161,162 to anchor 131 for location determination or use access link 410 to utilize cloud/server resource 420.

PWLS anchors 130, 131, 132, 133 are selectively located at fixed, known or relative locations relative to the user's choice of system coordinates. The radio transmission paths 140, 141, 142, 143 are the shortest distances from the PWLS anchors 130, 131, 132, 133 to the transceiver/processor 150 which is operating within a line-of-sight barrier 100. In order to calculate the position of a transceiver/processor 150 operating within a line-of-sight barrier 100, normal vector geometry techniques are utilized by the PWLS portion of the transceiver/processor 150. The position/navigation solution of the transceiver/processor 150 operating within a line-of-sight barrier 100, is relative to the location of the PWLS anchors 130, 131, 132, 133. The solution may be output to any global or local co-ordinate system in any standard Cartesian X,Y,Z coordinates, latitude/longitude/altitude, or any other customized coordinate system.

The coordinates which represent position, or discreet locations, which can be averaged over time for navigation purposes, may be transferred via data link 410 to the optional host computer 420. The following are examples, but not limited to, the enhanced information services provided by the optional host computer 420:

GIS maps for two- and/or three-dimensional positioning and navigational purposes.

Database for positioning and navigational analysis.

Optionally, the system's accuracy and integrity can be verified and calibrated by comparing the transceiver/processors 150 calculated position to a fixed, known position at scheduled or random intervals when located in direct line of sight of GNSS anchors 101, 102, 103, 104, and within or without a line-of-sight barrier 100 when using PWLS anchors 130, 131, 132, 133.

While the present invention describes a system for providing integrated and correlated GNSS and PWLS data to transceiver/processor 150 operating either in direct line of sight of GNSS anchors 101, 102, 103, 104, or within a line-of-sight barrier 100 when using PWLS anchors 130, 131, 132, 133 it is contemplated that variations and modifications will be developed within the teaching of the present disclosure.

Figure 2:
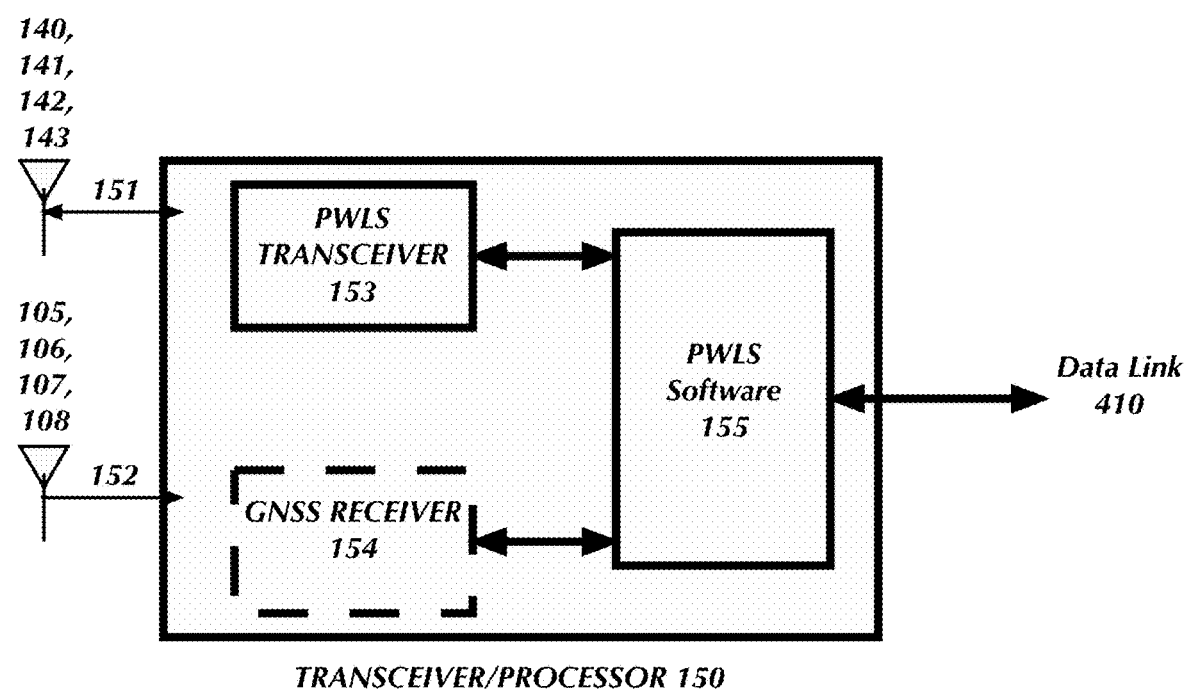
FIG. 2 is a block diagram of the transceiver/processor used in the present invention

FIG. 2 illustrates the general configuration of a transceiver/processor 150 used in the present invention. The PWLS transceiver 153 portion of the transceiver/processor 150 receives PWLS beacon signals 130, 131, 132, 133 via radio transmission paths 140, 141, 142, 143 via transceiver antenna 151. The PWLS transceiver 153 processes the PWLS beacon signals 130, 131, 132, 133 received via radio transmission paths 140, 141, 142, 143 or initiates the transmission for the purpose of determining positioning/navigation data. This data if locally determined is transmitted to the solution software 155 for integrating and correlating or transmitting the data in coordination or not with the optional GNSS receiver data. The GNSS receiver 154 portion of the transceiver/processor 150 receives GNSS beacon signals 101, 102, 103, 104 via radio transmission paths 105, 106, 107, 108, 113 via GNSS receiver antenna 152. The GNSS receiver 154 processes the direct line of sight GNSS beacon signals 101, 102, 103, 104 via radio transmission paths 105, 106, 107 and 108. This data is transmitted to the solution software 155 for integrating and correlating with PWLS receiver 153 data. The solution software 155 integrates and correlates the PWLS and GNSS data, and transmits to an optional host computer via data link 410. The solution software 155 can be programmed to define a three-dimensional space which encompasses at a minimum the line-of-sight barrier 100. This space is continuously monitored by the transceiver/processor 150 and used to activate the PWLS transceiver 153 for use within a line-of-sight barrier 100, and to activate the GNSS receiver 154 indirect line of sight of GNSS anchors 101, 102, 103, 104.

Having described the invention, we claim:

1. System to determine a location and navigational movement of a tag or a device on or near the surface of the earth comprising:

at least three anchors, each anchor located at an arbitrary geographical location indoors or outdoors, each anchor listening for pulsed location data and signals from distinct source transceivers or processors contained in tags or devices, listening for pulsed location data and signals from adjacent said anchors and transmitting pulsed location data and signals to other said anchors and/or the transceivers or processors contained in tags or devices, a transceiver or a processor associated with each said anchor comprising, a first transceiver for receiving said pulsed location data and signals from a single or multiplicity of source anchors or source transceivers or processors contained in tags or devices, and for transmitting pulsed location data and signals to a single or multiplicity of source anchors or source transceivers or processors contained in tags or devices and forwarding processed pulsed location data and signals to a central server for calculation, consumption and storage, a processor coupled to said first transceiver to measure and calculate location or distance of source transceivers or processors contained in tags or devices or other anchors and prepare for relay to a central server for calculation, consumption and storage, the location or the distance of the source transceivers or processors being calculated by:
  receiving a pulse;
  aligning the pulse with a known reference pulse;
  removing carrier frequency and phase offset from the pulse; and
  performing a multi-frequency phase comparison;

the tag or the device located on or near the surface of the earth either listening for pulsed location data and signals from said anchors or transmitting for pulsed location data and signals to said anchors, a transceiver or processor associated with each said tag or device, said transceiver or processor comprising, a first transceiver for receiving pulsed location data and signals from said anchors and/or transmitting pulsed location data and signals, a processor coupled to said first transceiver to measure and calculate the location or distance of source anchors pulsed location data and signals, and generate pulsed location data and signals for other anchors based on the calculated location or distance, a central cloud-based, local based or anchor colocated transceiver or processor or storage for reception of location data from said anchors, multi-lateration calculation of and storage of location solutions for application or user data consumption.

2. The system of claim 1 wherein
a first antenna exterior to or interior to a line-of-sight barrier collects data for the transceiver or processor transmitted by said anchors or tags/devices.

3. The system of claim 1 wherein
each of said at least three anchors is ground based and mounted at an elevation,
at least one of said at least three anchors disposed at an elevation different from others of said anchors.

4. The system of claim 1 wherein
each of said at least three anchors is utilized for location in two dimensions, one or more additional anchors utilized for three dimensions.

5. System to determine the location and navigational movement of a tag or a device on or near the surface of the earth comprising:
at least three anchors, each anchor located at a surveyed geographical location, each anchor listening for pulsed location data and signals from distinct source transceivers or processors contained in tags or devices, listening for pulsed location data and signals from adjacent said anchors and transmitting pulsed location data and signals to other said anchors and/or the transceivers or processors contained in tags or devices, a transceiver or a processor associated with each said anchor comprising, a first transceiver for receiving said pulsed location data and signals from a single or multiplicity of source anchors or source transceivers or processors contained in tags or devices, and for transmitting pulsed location data and signals to a single or multiplicity of source anchors or source transceivers or processors contained in tags or devices and forwarding processed pulsed location data and signals to a central server for calculation, consumption and storage, a processor coupled to said first transceiver to measure and calculate location or distance of source transceivers or processors contained in tags or devices or other anchors and prepare for relay to a central server for calculation, consumption and storage, the location or the distance of the source transceivers or processors being calculated by:
  receiving a pulse;
  aligning the pulse with a known reference pulse;
  removing carrier frequency and phase offset from the pulse; and
  performing a multi-frequency phase comparison;

the tag or the device located on or near the surface of the earth either listening for pulsed location data and signals from said anchors or transmitting for pulsed location data and signals to said anchors, a transceiver or processor associated with each said tag or device, said transceiver or processor comprising, a first transceiver for receiving pulsed location data and signals from said anchors and/or transmitting pulsed location data and signals, a processor coupled to said first transceiver to measure and calculate the location or distance of source anchors pulsed location data and signals, and generate pulsed location data and signals for other anchors based on the calculated location or distance, a central cloud-based, local based or anchor collocated transceiver or processor or storage for reception of location data from said anchors, multi-lateration calculation of and storage of location solutions for application or user data consumption.

6. System to determine a location and navigational movement of a tag or a device on or near the surface of the earth comprising:
a system of earth-orbiting satellites, each satellite transmitting distinct time and position data identifiable with said satellite,
at least three anchors, each anchor located at a global coordinate location, each anchor listening for pulsed location data and signals from distinct source transceivers or processors contained in tags or devices, listening for pulsed location data and signals from adjacent said anchors, listening to GNSS satellites location data and signals and transmitting pulsed location data and signals to other said anchors and/or the transceivers or processors contained in tags or devices, a transceiver or a processor associated with each said anchor comprising, a first transceiver for receiving said pulsed location data and signals from a single or multiplicity of source anchors or source transceivers or processors contained in tags or devices, and for transmitting pulsed location data and signals to a single or multiplicity of source anchors or source transceivers or processors contained in tags or devices and forwarding processed pulsed location data and signals to a central server for calculation, consumption and storage, a GNSS receiver for receiving and analyzing said distinct time and position data transmitted by at least three of said earth-orbiting satellites, a processor coupled to said first transceiver to measure and calculate location or distance of source transceivers or processors contained in tags or devices or other anchors and prepare for relay to a central server for calculation, consumption and storage, the location or the distance of the source transceivers or processors being calculated by:

receiving a pulse;

aligning the pulse with a known reference pulse;

removing carrier frequency and phase offset from the pulse; and performing a multi-frequency phase comparison;

the tag or the device located on or near the surface of the earth either listening for pulsed location data and signals from said anchors or transmitting for pulsed location data and signals to said anchors, a transceiver or processor associated with each said tag or device, said transceiver or processor comprising, a first transceiver for receiving pulsed location data and signals from said anchors and/or transmitting pulsed location data and signals, a processor coupled to said first transceiver to measure and calculate the location or distance of source anchors pulsed location data and signals, or generate pulsed location data and signals for other anchors based on the calculated location or distance, a central cloud-based, local based or anchor collocated transceiver or processor or storage for reception of location data from said anchors, multi-lateration calculation of and storage of location solutions for application or user data consumption.

7. System to determine a location and navigational movement of a tag or a device on or near the surface of the earth comprising:

a system of earth-orbiting satellites, each satellite transmitting distinct time and position data identifiable with said satellite, at least three anchors, each anchor located at global coordinates location, each anchor listening for pulsed location data and signals from distinct source transceivers or processors contained in tags or devices, listening for pulsed location data and signals from adjacent said anchors, listening to GNSS satellites location data and signals and transmitting pulsed location data and signals to other said anchors and/or the transceivers or processors contained in tags or devices, a transceiver or a processor associated with each said anchor comprising, a first transceiver for receiving said pulsed location data and signals from a single or multiplicity of source anchors or source transceivers or processors contained in tags or devices, and for transmitting pulsed location data and signals to a single or multiplicity of source anchors or source transceivers or processors contained in tags or devices and forwarding processed pulsed location data and signals to a central server for calculation, consumption and storage, a processor coupled to said first transceiver to measure and calculate location or distance of source transceivers or processors contained in tags or devices or other anchors and prepare for relay to a central server for calculation, consumption and storage, the location or the distance of the source transceivers or processors being calculated by:

receiving a pulse;

aligning the pulse with a known reference pulse;

removing carrier frequency and phase offset from the pulse; and performing a multi-frequency phase comparison;

the tag or the device located on or near the surface of the earth either listening for pulsed location data and signals from said anchors, listening for GNSS location data and signals or transmitting for pulsed location data and signals to said anchors, a transceiver or processor associated with each said tag or device, said transceiver or processor comprising, a first transceiver for receiving pulsed location data and signals from said anchors and/or transmitting pulsed location data and signals, a GNSS receiver for receiving and analyzing said distinct time and position data transmitted by at least three of said earth-orbiting satellites, a processor coupled to said first transceiver to measure and calculate the location or distance of source anchors pulsed location data and signals, and generate pulsed location data and signals for other anchors based on the calculated location or distance, a central cloud-based, local based or anchor colocated transceiver or processor or storage for reception of location data from said anchors, multi-lateration calculation of and storage of location solutions for application or user data consumption.

* * * * *